United States Patent [19]
Cai et al.

[11] Patent Number: 5,550,908
[45] Date of Patent: Aug. 27, 1996

[54] MODEM COMMUNICATIONS INTEROPERABILITY WITH SERVICES EQUIPPED TO PROVIDE CALLING PARTY IDENTITY DELIVERY WITH CALL WAITING

[75] Inventors: Lujing Cai, Tinton Falls; Nuri R. Dagdeviren, Red Bank, both of N.J.

[73] Assignee: Lucent Technologies Inc., Murray Hill, N.J.

[21] Appl. No.: 457,937

[22] Filed: Jun. 1, 1995

[51] Int. Cl.⁶ .............................. H04M 3/42; H04M 1/56; H04M 15/06; H04M 3/00
[52] U.S. Cl. .......................... 379/215; 379/127; 379/142; 379/247
[58] Field of Search .................................. 379/93, 94, 96, 379/97, 98, 127, 142, 201, 215, 246, 247

[56] References Cited

U.S. PATENT DOCUMENTS

| | | | |
|---|---|---|---|
| 4,852,151 | 7/1989 | Dittakavi et al. | 379/215 X |
| 5,263,084 | 11/1993 | Chaput et al. | 379/215 |
| 5,287,401 | 2/1994 | Lin | 379/215 X |

OTHER PUBLICATIONS

*Bellcore Technical Reference TR-NWT-000575*, Issue 1, Oct. 1992, Revision 1, Dec., 1994, "CLASS Feature: Calling Identify Delivery on Call Waiting" FSD 01-02-1090.

*Bellcore Technical Reference GR-30-CORE*, Issue 1, Dec. 1994, "LSSGR: Voiceband Data Transmission Interface Section 6.6" (replaces Bellcore Technical Reference TR-NWT-000030, Issue 3, Bellcore, Apr. 1992).

*Primary Examiner*—Jeffery Hoffsass
*Assistant Examiner*—Harry S. Hong
*Attorney, Agent, or Firm*—Steven R. Bartholomew

[57] ABSTRACT

Techniques are disclosed for providing interoperability between a first modem and a calling identity delivery on call waiting (CIDCW) service. According to an embodiment disclosed herein, a first modem is coupled to an alerting signal receiver and a communications re-establishment device. The alerting signal receiver receives an alerting signal generated in response to an incoming call from a third party line if the first modem is communicating with a second modem. The communications re-establishment device reestablishes communications between the first modem and the second modem after the alerting signal receiver receives an alerting signal. The first modem is equipped to receive the alerting signal and reestablish communications with the second modem independent of the specific capabilities of the second modem, so that these techniques can be utilized in conjunction with a second modem not constructed in accordance with the embodiments disclosed herein.

12 Claims, 6 Drawing Sheets

MODEM COMMUNICATIONS INTEROPERABILITY WITH SERVICES EQUIPPED TO PROVIDE CALLING PARTY IDENTITY DELIVERY WITH CALL WAITING

BACKGROUND OF THE INVENTION

1. Description of Prior Art

Caller Identity Delivery on Call Waiting (CIDCW) is an optional service presently offered to telephone subscribers by some Local Exchange Carriers (LECs) over conventional tip/ring lines. The service is useful in situations where telephonic communications are in progress between a first telephonic device and a second telephonic device, and a third party directs an incoming call to the first telephonic device. If this first telephonic device is connected to a tip/ring line that is activated to implement the CIDCW service, the LEC sends an alerting signal to the first telephonic device to alert the telephone subscriber as to the existence of an incoming call from a third party. If the first telephonic device responds to the alerting signal with an acknowledgment signal, then the LEC sends an identity signal (also referred to as a CID signal) over the tip/ring line to the first telephonic device. The identity signal is indicative of the identity of the third party. In the present example, the alerting signal and the identity signal together comprise a first alerting signal sequence. If the third party call is not answered within approximately ten seconds after the termination of the first alerting signal sequence, the LEC sends a second signal alerting sequence to the first telephonic device. This second alerting sequence includes an alerting signal and, provided that the first telephonic device responds to the alerting signal with an acknowledgment signal, the second alerting sequence also includes an identity signal. Although the present example describes an alerting signal sequence that includes both an alerting signal and an identity signal, it is to be understood that an alerting signal sequence may include any desired combination of alerting signals and/or identity signals.

The CIDCW service differs from conventional Call Waiting services in that CIDCW delivers the identity signal immediately after the alerting signal is delivered. This process provides telephone subscribers with convenience of identifying important incoming telephone calls while an existing telephone call is already in progress. In this manner, telephone subscribers are provided with information helpful in deciding whether or not to switch to the new, incoming telephone call from an existing telephone call. CIDCW may be considered an enhancement of conventional caller identification (caller ID) services, which deliver information pertaining to the identity of the calling party only when the called party is in an on-hook state.

Technologies in voice band data communications have matured to the point that modem usage is now fairly commonplace. For example, modems enable residence-based personal computing devices to access large mainframe computers at central business locations over conventional PSTN (public switched telephone network) telephone lines, and to access various on-line database services to retrieve various types of information. These applications often utilize a telephone connection for a rather lengthy period of time. It is not at all unusual for a telephone line to be in use for hours at a time while a telephone subscriber is performing on-line database searches. If a third party attempts to call the telephone subscriber while the subscriber is already engaged in modem-to-modem communications, the incoming caller will receive a frustrating busy signal, with no indication as to why the called party's line is busy.

The CIDCW service provides a potential solution to the above problem. Unfortunately, existing modem products and applications (modem software) are not compatible with the CIDCW service. Upon receipt of an incoming call from a third party, the CIDCW service sends an alerting sequence to the first telephonic device, which effectively blocks all modem-to-modem communications for a block-out period lasting on the order of a few seconds. Modems respond to such a block-out period by disconnecting from the tip/ring line, effectively terminating modem-to-modem communications, even after the CIDCW interruption has ended. The maximum block-out period is 2.6 seconds if the first telephonic device acknowledges receipt of the alerting signal with an acknowledgment signal, and 1.17 seconds if the first telephonic device does not acknowledge receipt of the alerting signal with an acknowledgment signal. In either case, this block-out period would be of a duration sufficient to cause termination of modem-to-modem communications unless special precautions are taken, as will be described in greater detail hereinafter.

After modem-to-modem communications have been interrupted due to the occurrence of one or more CIDCW alerting signal sequences, the modems attempt a retraining procedure to reestablish communications. Such retraining procedures typically require at least ten seconds. Due to the fact that a second CIDCW alerting sequence may be sent out approximately 10 seconds after termination of the first sequence (as described above), this second CIDCW alerting sequence will likely interfere with a modem-to-modem retraining procedure already in progress. Note that the performance of a modem-to-modem retrain procedure requires more than 10 seconds, and that retrain commences after the first CIDCW alerting sequence has terminated, i.e., after the FSK data block has been received at the modem. Consequently, the second CIDCW alerting sequence proves to be destructive in that it arrives in the middle of retrain recovery.

What is needed is a technique for providing interoperability between a first modem and a CIDCW service. Such a technique should enable the first modem to receive a caller identity (CID) signal without dropping an existing connection between the first modem and a remote modem. The first modem should be equipped to implement this technique independent of the specific capabilities of the remote modem, so that these techniques can be utilized in a system that may include an existing modem product not constructed in accordance with the embodiments disclosed herein.

SUMMARY OF THE INVENTION

Techniques are disclosed for providing interoperability between a first modem and a caller identity delivery on call waiting (CIDCW) service. According to an embodiment disclosed herein, the first modem is coupled to an alerting signal receiver and a communications re-establishment device. The alerting signal receiver, enabled when the first modem is communicating with a second modem, receives an alerting signal sequence generated in response to an incoming call from a third party line. The communications re-establishment device reestablishes communications between the first and second modems after the alerting signal receiver receives an alerting signal sequence. The alerting signal sequence consists of any combination of alerting signals and identity signals. The identity signal includes information specifying the identity of the third party line. The first modem is equipped to receive the alerting signal sequence and to re-establish an existing connection to the second modem independent of the specific capabilities of the second modem. In this manner, the first modem may be utilized in conjunction with a second modem not constructed in accordance with the embodiments disclosed herein.

DETAILED DESCRIPTION OF THE INVENTION

The technical parameters of caller identity delivery on call waiting (CIDCW) are set forth in Bellcore Technical Reference TR-NWT-000575, CLASS Feature: Calling Identity Delivery on Call Waiting, FSD 01-02-1090, Issue 1 (Bellcore, October 1992), and Bellcore Technical Reference TR-NWT-000030, Voiceband Data Transmission Interface Generic Requirements, Issue 3 (Bellcore, April 1992), both of which are expressly incorporated by reference herein.

Figure 1:
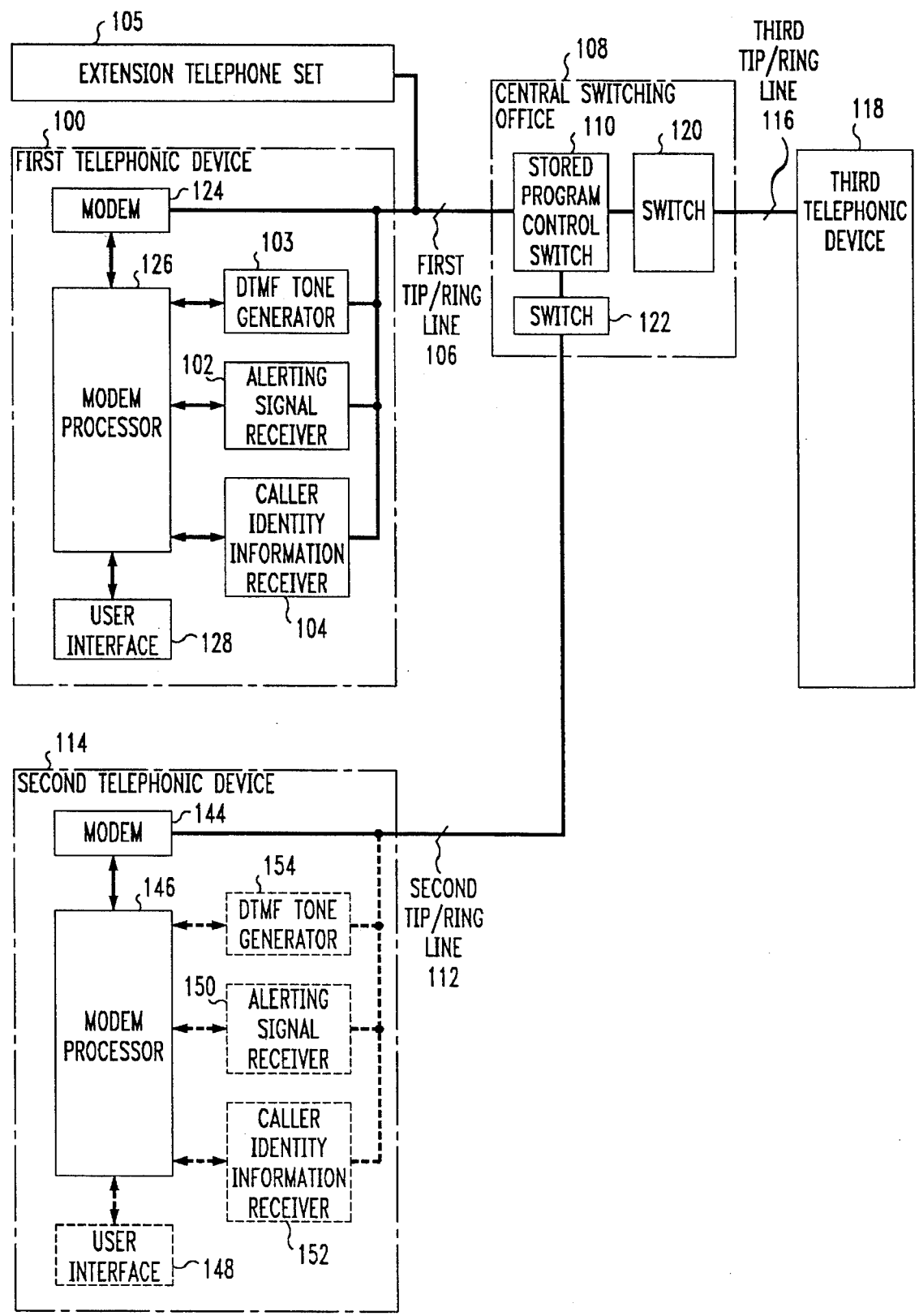
FIG. 1 is a hardware block diagram showing a system constructed in accordance with an embodiment disclosed herein.

According to an embodiment disclosed herein, an existing CIDCW service operates in conjunction with the hardware configuration of FIG. 1. Referring now to FIG. 1, a first telephonic device 100 is coupled to a first end of a first tip/ring line 106. An extension telephone set 105 is also coupled to the first end of first tip/ring line 106 in parallel with first telephonic device 100. Although extension telephone set 105 could be virtually any type of telephonic device equipped to implement voice communications, in the example of FIG. 1, extension telephone 105 is a POTS telephone (plain old telephone set). Extension telephone 105 generally remains on-hook while modem-to-modem communications are in progress.

The second end of first tip/ring line 106 is connected to a stored program control switch 110 (SPCS) at a central switching office 108. In the present example, it is assumed that the telephone customer using tip/ring line 106 is a CIDCW subscriber. Therefore, SPCS 110 is equipped to implement the CIDCW service over tip/ring line 106. In order to advantageously utilize the CIDCW service, first telephonic device 100 is equipped with an alerting signal receiver 102, a caller identity information receiver 104, and a DTMF (dual-tone, multi-frequency) tone generator 103. The alerting signal receiver 102 is responsive to alerting signals transmitted by the SPCS over first tip/ring line 106 to produce a humanly discernible indication signifying the receipt of an alerting signal. The caller identity information receiver 104 is responsive to caller identity information to produce a humanly discernible indication specifying the identity of a calling party. A suitable receiver for use as caller identity information receiver 104 is known to those skilled in the art as a Bell 202 receiver. The DTMF tone generator 103 generates an acknowledgment signal in response to the receipt of an alerting signal by alerting signal receiver 102.

A first end of a second tip/ring line 112 is connected to a switch 122 in central switching office 108, and a second end of second tip/ring line 112 is connected to second telephonic device 114. A first end of a third tip/ring line 116 is connected to a switch 120 in central switching office 108, and a second end of third tip/ring line 116 is connected to a third telephonic device 118. Central switching office 108 is equipped to selectively control and/or interconnect switch 120, switch 122, and SPCS 110. Two switches, switch 120 and switch 122, are shown in FIG. 1 for illustrative purposes, it being understood that the embodiments disclosed herein contemplate the presence of a multiplicity of switches in routing some of the calls involved.

In the present example, first and second telephonic devices 100, 114, respectively, represent telephone equipment adapted to implement modem communications. First telephonic device 100 includes a modem 124 coupled to first tip/ring line 106. Modem 124 is controlled by a modem processor 126 equipped to execute modem software. This software, sometimes referred to as a modem application, controls the operation of modem 124, for example, through the use of conventional AT commands well-known to those skilled in the art. Modem 124 may optionally be upgraded to selectively apply switch hook flashes to first tip/ring line 106, and/or to detect the off-hook status of an extension s telephone device connected to tip/ring line, such as extension telephone set 105. Although modem 124 need not be equipped to perform error correction techniques, the handling of CIDCW events is greatly facilitated if modem 124 and modem 144 are communicating using an error correction protocol such as V.42.

A user interface 128 includes one or more user interface devices such as a keypad, push-button switches, a computer keyboard, and/or a video display device. User interface 128 is coupled to modem processor 126.

Second telephonic device 114 may have a hardware structure similar to that of first telephonic device 100, but there is no requirement that second telephonic device 114 include hardware structures identical to those of first telephonic device 100, so long as both first and second telephonic devices 100, 114, respectively, include modems 124, 144, respectively. In the present example, second telephonic device 114 includes modem 144, modem processor 146, optional user interface 148, optional DTMF tone generator 154, optional alerting signal receiver 150, and optional caller identity information receiver 152. In this manner, first telephonic device 100 provides interoperability with existing CIDCW services, irrespective of whether or not second telephonic device 114 provides such interoperability.

Alerting signal receiver 102 and caller identity information receiver 104 are shown as being fully integrated within first telephonic device 100. However, the alerting signal receiver 102 and/or caller identity receiver 104 could be external to first telephonic device 100, so long as the alerting signal receiver 102 and the caller identity information receiver 104 are both coupled to first tip/ring line 106 through the use of a filtering and isolation device such as a directional coupler. The directional coupler serves the purpose of isolating modem signals transmitted by first modem 124 from the alerting signal receiver 102 and the caller identity information receiver 104. Although modem 124, DTMF tone generator 103, and modem processor 126 are shown as discrete blocks, it is to be understood that these blocks may actually represent a single integrated device that includes a modem, a tone generator, and a processor.

Third telephonic device 118 represents any device capable of establishing and performing communications over third tip/ring line 116, and, therefore, third telephonic device could, but need not, include a modem. In the present example, third telephonic device 118 is a POTS telephone (plain old telephone set).

The CIDCW service operates as follows. Assume that modem 124 -to- modem 144 communications are presently taking place between first telephonic device 100 and second telephonic device 114 via first tip/ring line 106, SPCS 110, switch 122, and second tip/ring line 112. Subsequent to the establishment of modem 124 -to- modem 144 communications, but before such communications are terminated, the central switching office 108 receives an incoming call from third telephonic device 118 directed to first telephonic device 100. In response to this third-party incoming call from third telephonic device 118, SPCS 110 alerts first telephonic device 100 as to the existence of the incoming call by sending an audible alerting signal in the form of a Subscriber Alerting Signal (SAS) to first telephonic device 100. Next, the SPCS 110 sends first telephonic device 100 another alerting signal termed the Customer premises equipment Alerting Signal (CAS). In response to the detection of the CAS alerting signal, the DTMF tone generator 103 of first telephonic device 100 transmits an acknowledgment (ACK) to SPCS 110. The ACK signal, in the form of a DTMF tone, instructs SPCS 110 to commence transmission of FSK data that includes calling party identity information, also referred to as CID information. The SAS signal, CAS signal, and FSK data, taken together, comprise a first alerting signal sequence.

Figure 2:
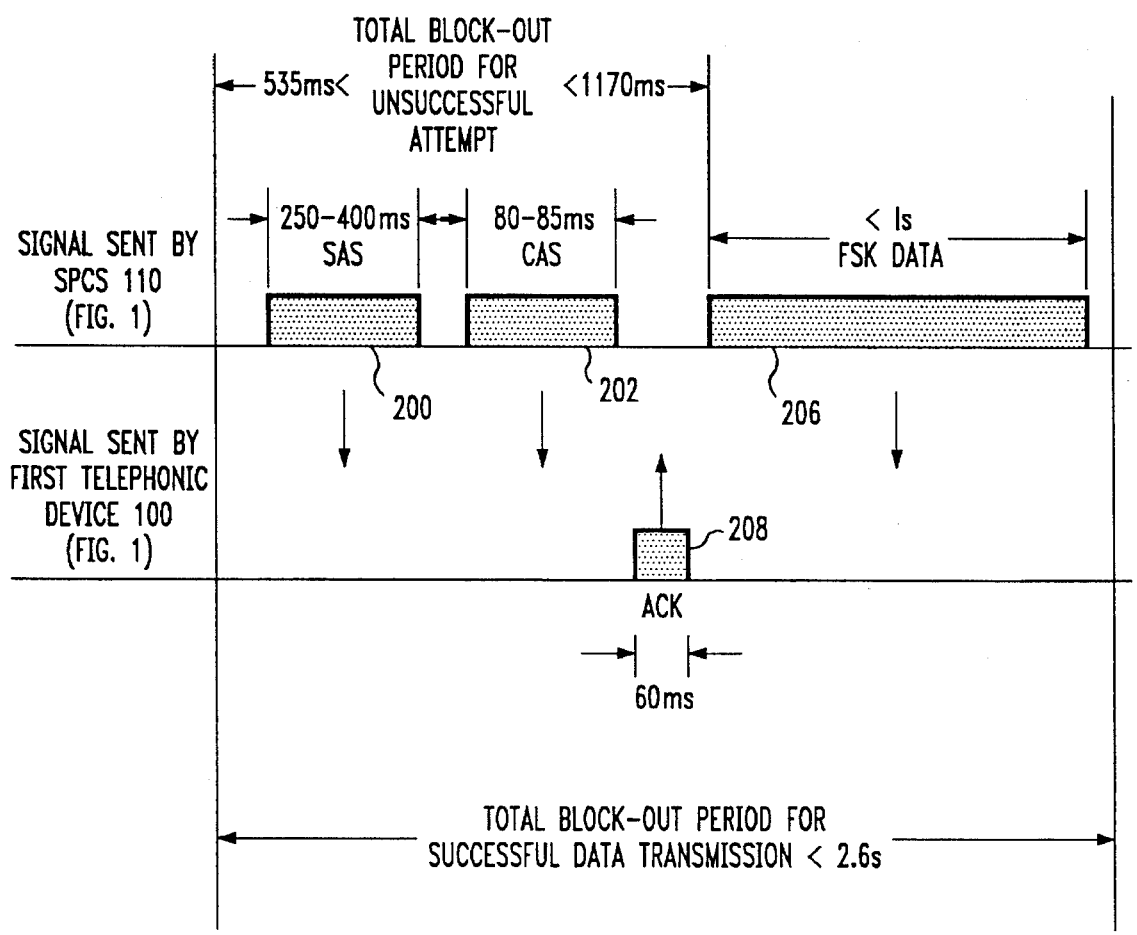
FIG. 2 sets forth an illustrative signaling procedure used in conjunction with an existing caller identity delivery on call waiting (CIDCW) service.

The characteristics of the SAS, CAS, and ACK signals are shown in FIG. 2. The duration of the SAS signal 200 sent by SPCS 110 (FIG. 1) is approximately 250 to 400 milliseconds, the duration of the CAS signal 202 is approximately 80–85 milliseconds, and the duration of the FSK data 206 that includes CID information is less than one second. The CAS signal 202 is not sent out immediately after cessation of the SAS signal 200, nor are the FSK data 206 sent out immediately after cessation of the CAS signal 202; these signals are separated by brief time intervals such that the total elapsed time from the beginning of the SAS signal 200 to the beginning of the FSK data 206 is from approximately 535 milliseconds to 1170 milliseconds. The ACK signal 208 is sent out by telephonic device 100 in response to the receipt of a CAS signal 202, and the duration of the ACK signal 208 is approximately 60 milliseconds. The total time period during which modem-to-modem communications are interrupted between first and second telephonic devices 100, 114 (FIG. 1 ), respectively, is of the order of no greater than 2.6 seconds.

In order to prevent a remote party at second telephonic device 114 from hearing the SAS signal 200, the CAS signal 202, the ACK signal 208, and the FSK data 206, SPCS 110 temporarily blocks all communications between first telephonic device 100 and second telephonic device 114 until the transmission of FSK data 206 ceases. As previously stated, for a conventional CIDCW service, the entire block-out period lasts for no longer than 2.6 seconds. However, note that SPCS 110 (FIG. 1) will not transmit FSK data 206 unless the SPCS 110 receives an ACK signal 208. In the case where SPCS 110 does not receive an ACK signal 208 from first telephonic device 100, the SPCS 110 restores the communications path between first and second telephonic devices 100, 114, respectively, shortly after termination of the CAS signal 202, leading to a much shorter block-out period of less than 1.17 seconds.

Based upon information included in the FSK data 206 block and received by caller identity information receiver 104 (FIG. 1), the CIDCW customer (i.e., the user) using first telephonic device 100 may choose to answer the third-party incoming call by, for example, flashing the switch hook of first telephonic device 100. However, instead of answering the third-party incoming call, the CIDCW customer may prefer to ignore this call. Therefore, user interface 128 issues a prompt, requesting the user to take certain action, such as pressing a key or flashing the telephone switch hook, if it is desired to accept the third-party incoming telephone call. If the user wishes to accept the call, appropriate information, such as a key press, may be entered into user interface 128 or, alternatively, the user may flash the switch hook of telephonic device 100.

An alerting signal sequence may include any combination of a CAS signal is 202, an SAS signal 200, and FSK data 206. After perceiving a humanly discernible indication generated by the alerting signal receiver 102 in response to receipt of an alerting signal sequence, the user may fail to flash the switch hook or fail to enter other appropriate input into user interface 128. In the present example, the alerting signal sequence includes an SAS signal 200 followed by a CAS signal 202, as shown in FIG. 2. If the incoming call from the third telephonic device 118 is still active, i.e., the third party has not returned the third telephonic device 118 to an on-hook condition, then the SPCS 110 (FIG. 1) sends a second alerting signal sequence to the first telephonic device 100 approximately 10 seconds after the first alerting signal sequence is sent. In the present example, this second alerting signal sequence includes an SAS signal 200, although the second alerting signal could include an SAS signal 200 in addition to a CAS signal 202, and, in either case, this second alerting signal sequence could, but need not, include FSK data 206.

Upon receipt of an incoming call from third telephonic device 118 and the resulting activation of the CIDCW service by SPCS 110, modem 124 -to- modem 144 communications between first and second telephonic devices 100, 114, respectively, will be interrupted for about 2.6 seconds. The effect of a 2.6-second interruption on modem 124 -to-modem 144 communications is as follows. For conventional modem operation, constant carrier energy on the tip/ring line 106 (FIG. 1) is necessary to maintain a stable modem-to-modem communications link. If this condition is not met, the modem tends to "disconnect", i.e., to return to an on-hook condition, shortly after loss of carrier.

The time duration for which modem 124 will remain off-hook and connected to tip/ring line 106 (FIG. 1) during a carrier interruption is determined by a software application executed by modem processor 126. Modem 124, as well as many presently-existing modems, include this software application in the form of a register known as the S10 register. The numerical value loaded into the S10 register determines the amount of time for which the modem will remain off-hook during a modem carrier interruption before disconnection takes place. A default value less than or equal to 2 seconds is typically loaded into the S10 register.

If a modem carrier is interrupted for a period of time greater than about 1.5 seconds, the modems must perform a full retrain procedure in order to recover modem-to-modem communications. Typical retrain procedures require about 10 seconds or more to reestablish communications. It should be emphasized that, during the retraining procedure, any signals on tip/ring line 106 (FIG. 1) that are not a part of the retraining procedure will cause retrain failure. Likewise, any discontinuities or interruptions along a path including first tip/ring line 106, SPCS 110, switch 122, and second tip/ring line 112 will also cause retrain failure. If retrain failure occurs, most existing modems will unconditionally disconnect from the tip/ring line without attempting any additional retrain procedures.

In order to provide interoperability between a first modem and a CIDCW service, techniques are required for receiving CID (caller identity) information without dropping an existing connection between the first modem and a remote modem. The first modem should be equipped to implement these techniques independent of the specific capabilities of the remote modem, so that these techniques can be utilized in a system that may include an existing modem product not constructed in accordance with the embodiments disclosed herein.

Figure 3:
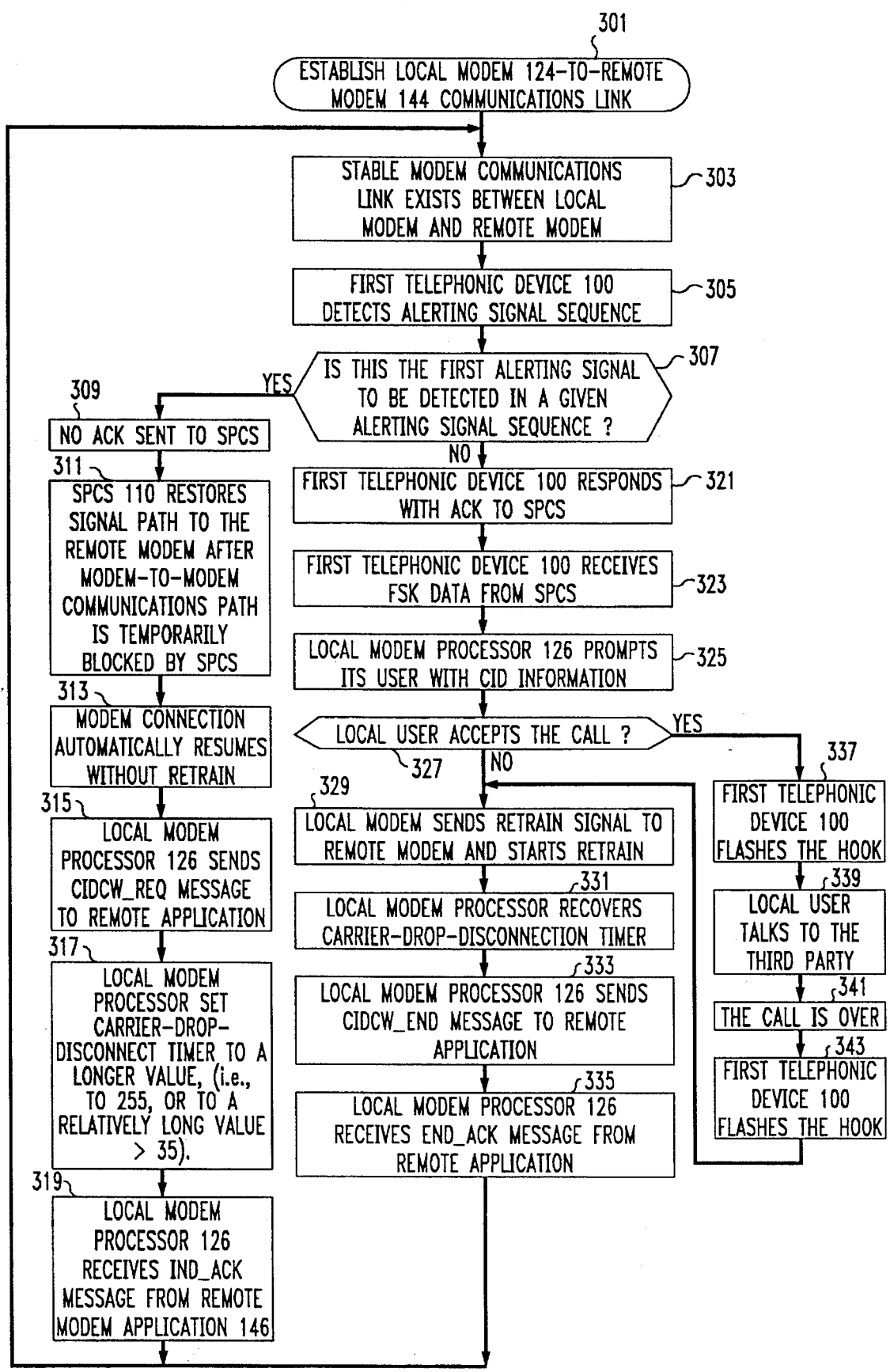
FIGS. 3 and 4 are software flowcharts illustrating a first set of operational sequences for providing interoperability between a modem and a caller identity delivery on call waiting (CIDCW) service.
Figure 4:
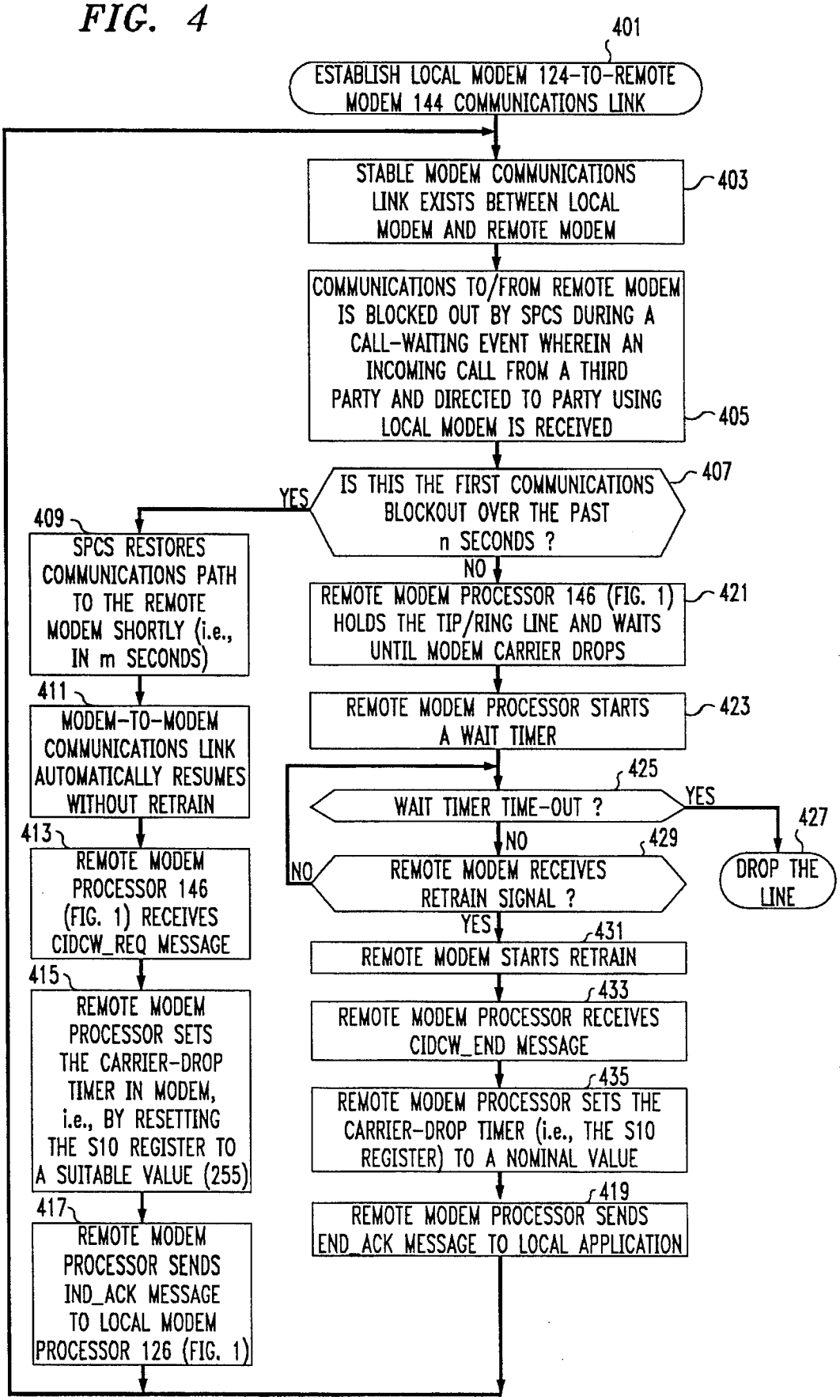

FIGS. 3 and 4 are software flowcharts setting forth a first set of operational sequences for providing interoperability between a modem and a calling identity delivery on call waiting (CIDCW) service according to a first embodiment disclosed herein. The operational sequence of FIG. 3 is performed by first telephonic device 100 (FIG. 1), and the operational sequence of FIG. 4 is performed by second telephonic device 114 (FIG. 1). First telephonic device 100 may be conceptualized as representing a local modem-equipped device, whereas second telephonic device 114 may be conceptualized as representing a remote modem-equipped device.

The local modem-equipped device includes enhanced software for executing the operational sequence of FIG. 3, whereas the remote modem-equipped device includes enhanced software for executing the operational sequence of FIG. 4. In practice, a modem constructed in accordance with an embodiment disclosed herein would be equipped with software for executing the operational sequences of FIG. 3 as well as those of FIG. 4, so as to enable a given modem to function as a local modem in some situations and as a remote modem in other situations. For example, a third party call directed to the user of a given modem would render that modem the local modem. By contrast, a third party call directed to the user of a second modem to which the given modem is presently communicating would render the given modem the remote modem. The operational sequence of FIG. 4, performed by the remote modem-equipped device, illustrates the manner in which the enhanced software of the remote modem-equipped device interacts with the enhanced software of FIG. 3.

The operational sequence of FIG. 3 commences at block 301 where a local modem 124- to - remote modem 144 (FIG. 1) communications link is established. At block 303, a stable modem-to-modem communications link is in progress. Next, first telephonic device 100 (FIG. 1) detects an alerting signal sequence (FIG. 3, block 305). This detection may be performed such that only a portion of an alerting signal sequence is detected or, alternatively, the telephonic device 100 may test for the existence of an entire alerting signal sequence at this time. A test is performed at block 307 to determine whether or not this is the first alerting signal to be detected in a given alerting signal sequence. For example, an alerting signal sequence may consist of an SAS 200 signal followed by a CAS 202 signal (FIG. 2). In this case, the first alerting signal is the SAS 200 signal. The affirmative branch from block 307 (FIG. 3) leads to block 309, whereas the negative branch from block 307 leads to block 321.

At block 309, the DTMF tone generator 103 (FIG. 1) does not send an ACK (acknowledgment signal) (FIG. 2, 208) to SPCS (FIG. 1, 110). SPCS 110 restores the signal path between local modem 124 and remote modem 144. This path was broken by the SPCS 110 during the time that the SPCS sent the first alerting signal to first telephonic device 100. Due to the fact that the signal path was interrupted for a relatively brief period of time, modem-to-modem communications now automatically resume, and this resumption occurs without the execution of any modem retraining sequence (block 313). Local modem processor 126 sends a CIDCW_REQ message to the remote modem processor 146 signifying the existence of a call waiting event (block 315). The local modem processor 126 disables a carrier-drop timer. This timer is effectively provided in the form of the previously-described S10 register. In the present example, the value of the S10 register is set to an appropriate value (i.e., 255), such that the local modem 124 will not disconnect for an indefinite period of time in the absence of a modem carrier signal (block 317). At block 319, the local modem processor 126 receives an IND_ACK message from remote processor 146. IND_ACK is a message sent out by a microprocessor that is indicative of the receipt of an ACK (acknowledgment) signal by that microprocessor. After performance of the operations at block 319, program control loops back to block 303.

The negative branch from block 307 leads to block 321 where the first telephonic device 100 (FIG. 1) responds by sending an ACK signal to the SPCS 110. The first telephonic device 100 then receives FSK data from the SPCS (block 323), and the local modem processor 126 prompts the user of first telephonic device 100 with caller identification information specifying the identity of the third-party caller.

At block 327, the user must decide whether or not to accept the incoming third-party call. If the user decides to accept the call, program control advances to block 337 where first telephonic device 100 applies a switch hook flash to the first tip/ring line 106. At block 339, the user of first telephonic device 100 is engaged in telephonic communications with the third-party caller, and, at block 341, telephonic communications with the third-party caller have been completed. The first telephonic device 100 applies a switch hook flash to the first tip/ring line 106 (block 343). Program control then jumps to block 329 where the local modem 124 sends a retrain signal to the remote modem 144 and starts a retrain process. Note that the negative branch from block 327 leads directly to block 329 and, in this case, the steps of blocks 337–343 are not performed.

After the operations of block 329 are performed the program advances to block 331 where the local modem processor 126 recovers the carrier-drop disconnect timer. This function may be accomplished by setting the previously-described S10 register to an appropriate value. Next (block 333), the local modem processor 126 sends a CIDCW_END message to the remote modem processor 146. The CIDCW_END message is a message sent out by a microprocessor indicative of the termination of a call waiting event by telephonic equipment coupled to that microprocessor. The local modem processor 126 then receives (at block 335) an END_ACK message from the remote modem processor 146. The END_ACK message is sent out by a microprocessor in response to that microprocessor having successfully received a CIDCW_END message. At this point, the program loops back to block 303.

With respect to the procedure of FIG. 3, at the time that an incoming call from the third party arrives at the SPCS 110, the communications path between the local modem 124 and the remote modem 144 is temporarily interrupted. Then, the alerting sequence is inserted by the SPCS and sent to the first telephonic device 100 where the alerting sequence is easily detected. To avoid retrain failure, the local modem 124 is programmed to effectively ignore this alerting sequence. The local modem does not return any acknowledgment signal which would prevent data transmission from taking place. As a result, the communications path between local and remote modems is restored shortly thereafter, within a time period that is of sufficiently short duration for the modem-to-modem connection to be recovered without retrain. Therefore, communications between modem processors 126 and 146 is re-established well before the second alerting signal sequence arrives. In this manner, a CIDCW_REQ message (or an equivalent message indicative as to the existence of a CIDCW call waiting event) can be sent from the local modem processor 126 to the remote modem processor, effectively informing the remote modem processor 146 to be prepared for a CIDCW (call waiting) event. The carrier-drop-disconnect timer in the local modem 124 is then set to an effective value of infinity by loading the S10 register with a value of 255 (representing infinity in the present case) after the alerting signal sequence is received from the SPCS 110.

Refer now to FIG. 4, which sets forth the sequence of operations to be performed by second telephonic device 114. Note that these operations are performed interactively with the sequence of operations implemented by first telephonic device 100 as described above in connection with FIG. 3. At block 401 (FIG. 4), a local modem 124 - to - remote modem 144 (FIG. 1) communications link is established. Modem-to-modem communications may take place at block 403 (FIG. 4), where a stable modem-to-modem communications link exists between the local modem and the remote modem. At block 405, communications to and from the remote modem 144 (FIG. 1) are blocked out by the SPCS 110 during a CIDCW call waiting event. This CIDCW call waiting event occurs when central switching office 108 receives an incoming call from third telephonic device 118 directed to the party using first telephonic device 100.

At block 407, a test is performed to ascertain whether or not the communications block-out of block 405 is the first communications block-out to have occurred within the last n seconds. n is selected to be greater than or equal to the maximum duration of a CIDCW alerting signal sequence which, in the present case, is about 10 seconds. The affirmative branch from block 407 leads to block 409, and the negative branch from block 407 leads to block 421.

At block 409, the SPCS 110 restores the communications path between the local and remote modems within a period of time less than m seconds, wherein m represents a real number of a sufficiently short duration such that the local and remote modems do not have to perform a retrain to reestablish communications. The remote modem to local modem communications link automatically resumes without retrain (block 411). The remote modem processor 146 receives a CIDCW_REQ message (block 413) indicative of a request to prepare for a CIDCW call waiting event. The remote modem processor sets the carrier-disconnect drop timer in the modem by setting the S10 register to an appropriate value such as 255, where 255 represents a value of infinity (block 415). The remote modem processor then sends an IND_ACK message to the local modem processor 126 (block 417) acknowledging receipt of the CIDCW_REQ message of block 413, and program control loops back to block 403.

The negative branch from block 407 leads to block 421 where the remote modem 144 holds the first tip/ring line 106 and waits until a modem carrier is no longer received from the local modem, i.e., until the modem carrier drops. Once the carrier drops, the remote modem processor starts a "wait timer". At block 425, a test is performed to ascertain whether or not the wait timer has timed out. If the wait timer has timed out, the remote modem 144 disconnects from the tip/ring line 106, effectively terminating communications.

If the wait timer has not yet timed out, the program advances to block 429 where a test is performed to ascertain whether or not the remote modem has received a retrain signal. If not, the program loops back to block 425. If so, the program advances to block 431, where the remote modem starts performing a retrain procedure. The remote modem processor receives a CIDCW_END message from the local modem processor indicative of the end of a CIDCW call waiting event. The remote modem processor sets the carrier drop timer (i.e., the S10 register) to a nominal value (block 435). Next, the remote modem processor sends an END_ACK message to the local modem processor indicating that the remote modem processor acknowledges the end of a CIDCW call waiting event (block 419). The program then loops back to block 403.

Upon receiving the CIDCW_REQ message at block 413, the remote modem prepares for a call waiting event by setting the S10 register to a value of 255, effectively disabling the modem carrier-drop-disconnect timer. This allows the remote modem to endure the longer interruption in communications associated with the second CIDCW alerting signal sequence. Therefore, even though the modem connection is discontinued during the communications block-out, the remote modem will remain in the off-hook state, and remain holding the tip/ring line.

In conjunction with the operations of FIG. 4, caller identification (CIDCW) information is received as follows. Ten seconds after the first alerting signal sequence is sent to first telephonic device 100 by central switching office 108, the SPCS 110 sends a second alerting signal sequence. In the present case, this second alerting signal sequence includes a full FSK data transmission setting forth information pertaining to the identity of the calling third party. The FSK data transmission occurs because the third party call was not answered immediately after the first alerting signal sequence was received at first telephonic device 100. At the time that the second alerting signal sequence is received by first telephonic device 100, the first telephonic device returns an ACK signal to the central switching office. Also at this time, the caller identity information receiver 104 of first telephonic device 100 is enabled for receiving FSK data. Upon receipt of this FSK data, the user is prompted with caller identity (CID) information specifying the identity of the third-party caller.

The CID information received by caller identity information receiver 104 enables the user of telephonic device 100 to make an informed decision as to whether or not to answer the incoming third-party call. If the user choose to do so, the local modem 124 flashes the switch hook to instruct central switching office 108 to connect to the first tip/ring line 106 to the third-party incoming telephone call. Next, the user interface 128 instructs the user of first telephonic device 100 to pick up extension telephone set 105 to establish communications with the third-party caller. When the call is over and the user of first telephonic device 100 hangs up extension telephone 105, the local modem 124 flashes the switch hook again to instruct the central switching office 108 to couple first tip/ring line 106 with second telephonic device 114.

If the user of first telephonic device 100 does not intend to answer the third-party incoming call, or if the third party incoming call is lost for some reason, a full retrain procedure is initiated immediately by the local modem, or by the modem that would have restored modem-to-modem communications upon termination of the third-party call. When the CIDCW_END message representing the end of a CIDCW event is sent by the local modem processor, the carrier-drop-disconnect timers (S10 registers) of both local and remote modems are restored to an appropriate value.

With respect to the operational sequences of FIGS. 3 and 4, the local modem processor 126 as well as the remote modem processor 146 should both is include the enhanced software applications according to the various embodiments disclosed herein. A second embodiment is disclosed herein in connection with FIGS. 5 and 6. This second embodiment equips the local modem processor with enhanced software. The remote modem may, but need not, include such enhanced software, and it is expected that the remote modem would generally include conventional software. In this manner, enhanced modems may advantageously exploit the techniques disclosed herein when engaged in communications with conventional modems.

Figure 5:
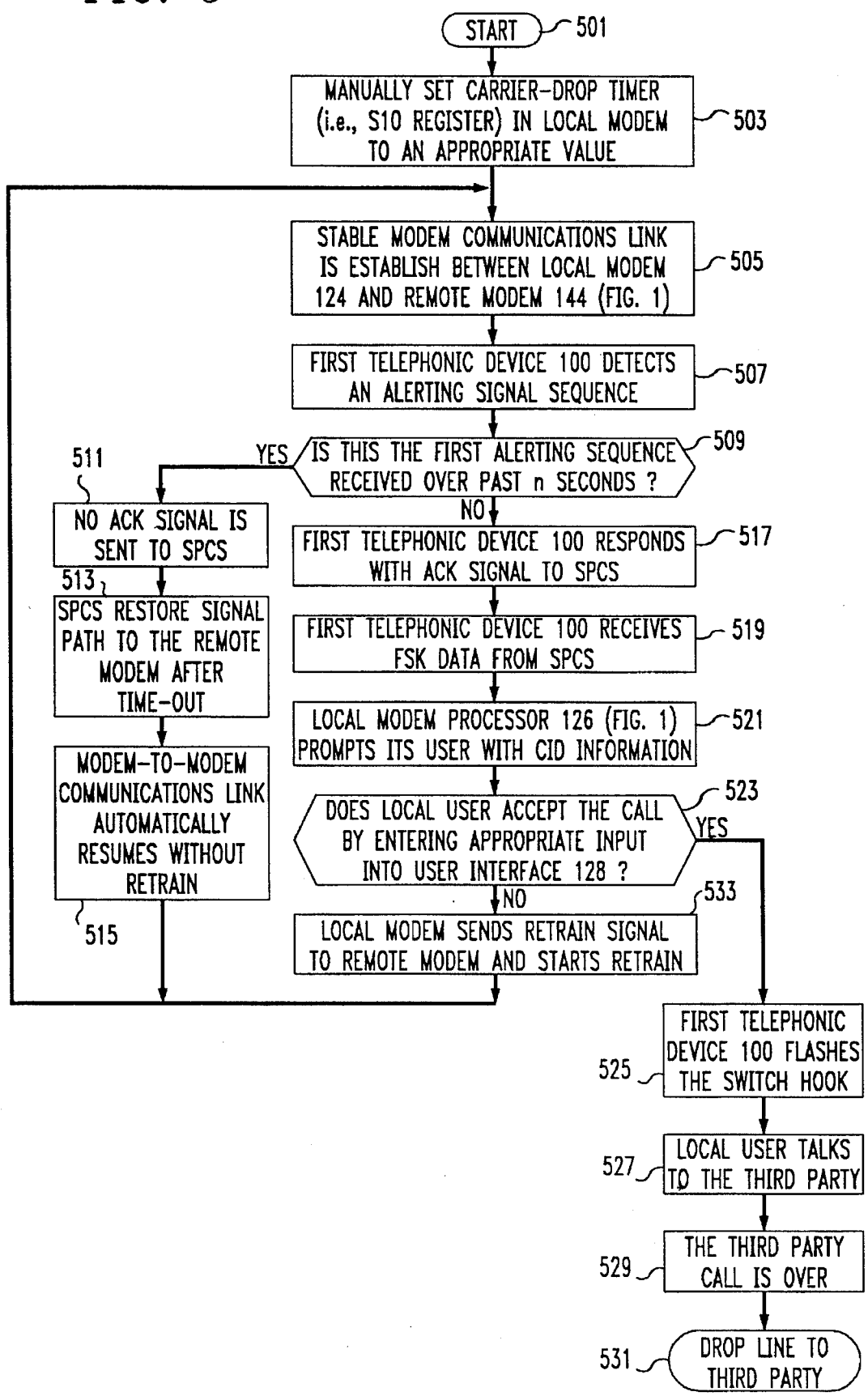
FIGS. 5 and 6 are software flowcharts illustrating a second set of is operational sequences for providing interop-
Figure 6:
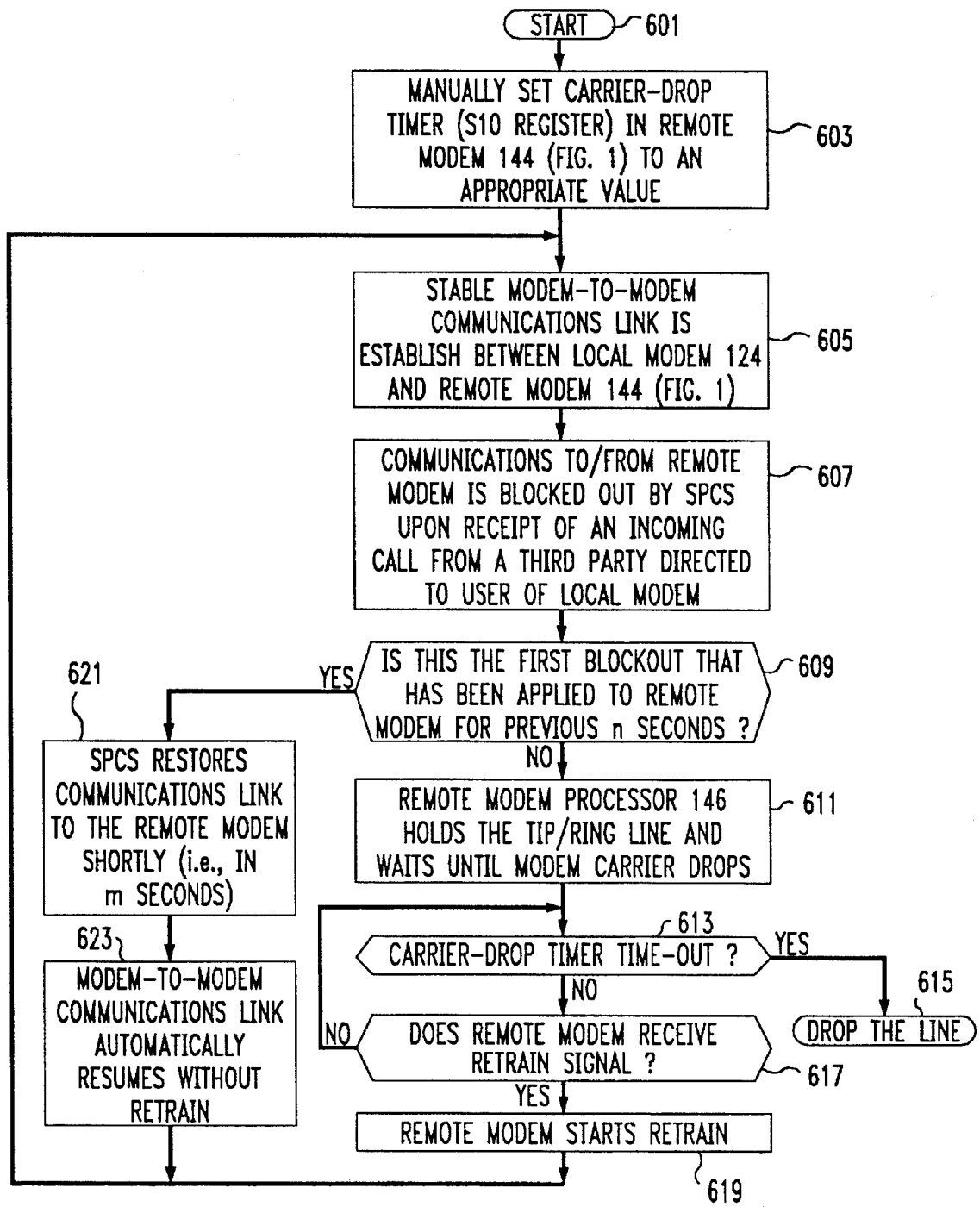

FIG. 5 sets forth an operational sequence to be performed by the local modem according to an embodiment disclosed herein, and FIG. 6 sets forth an operational sequence to be performed by a remote modem in response to the operational sequence of FIG. 5. In this example, the local modem is equipped with the enhanced software of FIG. 5, but the remote modem, equipped with conventional software, responds to the local modem of FIG. 5 by performing the operations of FIG. 6.

Referring now to FIG. 5, the program commences at block 501. The carrier-drop timer (S10) register is manually set in the local modem to am appropriate and/or desired value (block 503). A modem-to-modem communications link is established between the local modem 124 and the remote modem 144 (block 505). The first telephonic device 100 detects an alerting signal sequence (block 507) indicative of the receipt of a third-party incoming telephone call. At block 509, a test is performed to ascertain whether or not the alerting signal sequence received at block 507 is the first alerting signal sequence received over the past n seconds, wherein n is greater than or equal to approximately 10 seconds.

The affirmative branch from block 509 leads to block 511 where the first modem does not send an ACK signal to the SPCS. The SPCS restores the signal path to the remote modem after time-out (block 513), and modem-to-modem communications automatically resume without retrain (block 515). Program control then loops back to block 505.

The negative branch from block 515 leads to block 517 where the first telephonic device 100 responds to the alerting signal sequence by sending an ACK signal to the SPCS. The first telephonic device 100 then receives FSK data from the SPCS that includes caller identification (CID) information pertaining to the identity of the calling party. The local modem processor 126 downloads the CID information to the user interface 128 and the user interface prompts the user with this CID information.

At block 523, the user of first telephonic device 100 must decide whether or not to accept the incoming third party call. The user is aided in this task by the CID information displayed on user interface 128. User interface 128 instructs the user to enter the appropriate input if it is desired to accept the third party call, and/or instructs the user to enter the appropriate input if it is not desired to accept this call. If the user wishes to accept the call, program control advances to block 525 where the first telephonic device 100 flashes the switch hook, instructing the central switching office 108 to couple tip/ring line 106 to the third-party incoming call. The user communicates with the third party (block 527), and, at block 529, the third party call is terminated. At block 531, the central switching office 108 disconnects the third tip/ring line 116 from the first tip/ring line 106. However, if first telephonic device 100 is equipped with the appropriate software, it is not necessary for the central switching office 108 to drop the third-party connection.

The negative branch from block 523 leads to block 533 where the local modem sends a retrain signal to the remote modem. The local and remote modems then commence retrain procedures, and the program loops back to block 505.

The operational sequence of FIG. 5 differs from that of FIG. 3 in several respects. For example, instead of effectively disabling the carrier-drop-disconnect timer (S10 register) during the occurrence of a CIDCW call waiting event, the method of FIG. 5 permanently presets the S10 register to an appropriate value, i.e., 3 seconds, so that the local modem will remain in an off-hook state during communications block-outs caused by call waiting events. Note that this S10 register setting of 3 seconds will provide reasonable modem performance in the event of an actual carrier loss not caused by a call waiting event. When a call waiting event does occur, the local modem simply ignores the CIDCW alerting signal sequence without sending an ACK signal to the central switching office 108. In some system applications, the operational sequence of FIG. 5 is modified such that the user of first telephonic device is immediately prompted upon receipt of a first alerting signal sequence without being provided with CID information.

After the first alerting signal sequence is received at the local modem, modem-to-modem communications resumes shortly after the SPCS restores the communications path. Retraining procedures are not necessary to restore modem-to-modem communications. Ten seconds after receipt of the first alerting signal sequence, the second alerting signal sequence is sent out by the SPCS. At this time, the local modem responds with an ACK signal indicative of the detection of the second alerting. Then, the SPCS responds to the ACK signal by sending out FSK data including caller identification (CID) information. The CID information is displayed on user interface 128, which may include a computer screen that notifies the user as to the existence and identity of a new incoming call from a third party. Based upon the CID information presented on the user interface, the user may justify the importance of the call, and decide whether or not to answer the third party call.

If the user chooses not to answer the call, then modem-to-modem is communications are reestablished after a full retrain procedure. Due to the fact that the CID information usually contains the third party caller's telephone number, the user is provided with the opportunity to return the third party call at a later time, while modem communications are minimally disrupted.

If the user elects to answer the third party call, the first telephonic device 100 flashes the switch hook, instructing the central switching office to connect the third-party incoming call to the first tip/ring line 106. The user then pick up the extension telephone set 105 and communications with the third party now commence. Meanwhile, after expiration of a period of time equal to the value programmed into its S 10 register, the remote modem simply disconnects from the second tip/ring line 112.

FIG. 6 sets forth an operational sequence to be performed by a remote modem in response to the operational sequence of FIG. 5. The program commences at block 601. At block 603, the carrier-drop timer (S10 register) in remote modem 144 is set to an appropriate or desired value. A stable modem-to-modem communications link is established between local modem 124 and remote modem 144 (block 605). Upon the occurrence of a CIDCW call waiting event at local modem 124, communications to and from remote modem 144 are blocked by SPCS 110 (block 607). At block 609, a test is performed to ascertain whether or not the block-out of block 607 is the first block-out that has been applied to the remote modem during the previous n seconds, wherein n is greater than or equal to approximately 10 seconds. The affirmative branch from block 609 leads to block 621, and the negative branch from block 609 leads to block 611.

At block 621, the SPCS 110 restores the modem-to-modem communications link shortly, i.e., in m seconds, where m is less than approximately 1.2 seconds. The modem-to-modem communications link automatically resumes without retrain (block 623), and the program loops back to block 605.

At block 613, which is executed as the negative branch leading from block 611, a test is performed to ascertain whether or not the carrier-drop timer (S10 register) has timed out. If so, the remote modem disconnects from the second tip/ring line 112 (block 615). If not, the program performs a test to ascertain whether or not the remote modem receives a retrain signal (block 617). If not, the program loops back to block 613. If so, the program advances to block 619, where the remote modem starts a retrain procedure. The program then loops back to block 605.

Various techniques have been described in conjunction with FIGS. 3–6 that enable CIDCW subscribers to receive CID information while engaged in modem-to-modem communications. These procedures process modem-to-modem communications interruptions caused by CIDCW call-waiting events, such that modem operations gracefully continue. Pursuant to a first embodiment, which requires the use of enhanced modem software at both the local as well as the remote modem, full interoperability is provided between both modems and the CIDCW service. The modem user can switch back to modem operation without re-dialing after answering an incoming third-party call.

A second embodiment is useful in conjunction with remote modems that are only equipped with existing, non-enhanced software. This embodiment requires the use of enhanced software only at the local modem. However, the modem-to-modem communications link between local and remote modems is not recoverable once the local modem user answers the third-party call. This embodiment is advantageous in that customers may prefer not to hold the remote modem, thereby avoiding on-line service charges that may be based upon the length of time that these services are accessed. Although the local modem user is provided with CID information that may be helpful in deciding whether or not to accept an incoming call from a third party, the decision as to whether or not to accept a third party incoming call may also be based upon the relative interruptablility of the modem application the user is currently engaged in. If the loss of a modem connection will not impose any undue inconvenience in a given situation, the user may simply answer the third party call.

The Invention claimed is:

1. A method of providing interoperability between a first modem and a caller identity delivery on call waiting (CIDCW) service that operates when a communications link is established between the first modem and a remote modem, the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE METHOD CHARACTERIZED BY THE FOLLOWING STEPS:

(a) the first modem, upon receipt of the first portion of the first alerting signal sequence, not sending an acknowledgment signal to the CIDCW service; and (b) the first modem, upon receipt of the first portion of the second alerting signal sequence, sending an acknowledgment signal to the CIDCW service.

2. The method of claim 1 wherein the first portion of the first alerting signal sequence and the first portion of the second alerting signal sequence each include an audible subscriber alerting (SAS) signal, and a customer premises equipment alerting (CAS) signal.

3. The method of claim 1 wherein the second portion of the second alerting signal sequence includes FSK data specifying the identity of the third party caller.

4. A method of providing interoperability between a first modem and a caller identity delivery on call waiting (CIDCW) service that operates when a communications link is established between the first modem and a remote modem, the remote modem having a carrier drop register for storing a value indicative of the time duration for which the remote modem will hold a communications link in the absence of receiving a modem carrier over the communications link;

the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE METHOD CHARACTERIZED BY THE FOLLOWING STEPS:

(a) the first modem receiving the first portion of the first alerting signal sequence; and (b) the first modem sending a message to the remote modem instructing the remote modem to set the carrier drop register to a time duration at least as long as the duration of the first and second portions of the second alerting signal sequence.

5. The method of claim 4 further including the step of:

(c) the remote modem, upon receiving the message from the first modem in step (b), sending the first modem a confirmation signal, the remote modem setting its carrier drop register to the time duration specified by the message received from the first modem.

6. The method of claim 5 wherein the first portion of the first alerting signal sequence and the first portion of the second alerting signal sequence each include an audible subscriber alerting (SAS) signal, and a customer premises equipment alerting (CAS) signal.

7. The method of claim 5 wherein the second portion of the second alerting signal sequence includes FSK data specifying the identity of the third party caller.

8. A method of providing interoperability between a first modem and a caller identity delivery on call waiting (CIDCW) service that operates when a communications link is established between the first modem and a remote modem, the remote modem having a carrier drop register for storing a value indicative of the time duration for which the remote modem will hold a communications link in the absence of receiving a modem carrier over the communications link;

the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE METHOD CHARACTERIZED BY THE FOLLOWING STEPS:

(a) the first modem, upon receipt of the first portion of the first alerting signal sequence, not sending an acknowledgment signal to the CIDCW service;

(b) the first modem, upon receipt of the first portion of the second alerting signal sequence, sending an acknowledgment signal to the CIDCW service; and (c) the first modem sending a message to the remote modem instructing the remote modem to set the carrier drop register to a time duration at least as long as the duration of the first and second portions of the second alerting signal sequence.

9. Apparatus for providing interoperability between a first modem and a caller identity delivery on call waiting (CIDCW) service that operates when a communications link is established between the first modem and a remote modem, the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE APPARATUS CHARACTERIZED BY THE FIRST MODEM INCLUDING:

(a) a modem signal transmitter; and (b) a modem signal receiver coupled to the modem signal transmitter;

wherein, in response to the modem signal receiver receiving the first portion of the first alerting signal sequence, the modem signal transmitter not sending an acknowledgment signal to the CIDCW service; and wherein, in response to the modem signal receiver receiving the first portion of the second alerting signal sequence, the modem signal transmitter sending an acknowledgment signal to the CIDCW service.

10. Apparatus for providing interoperability between a first modem and a caller identity delivery on call waiting (CIDCW) service that operates when a communications link is established between the first modem and a remote modem, the remote modem having a carrier drop register for storing a value indicative of the time duration for which the remote modem will hold a communications link in the absence of receiving a modem carrier over the communications link;

the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE APPARATUS CHARACTERIZED BY THE FIRST MODEM INCLUDING:

(a) a modem signal transmitter, and (b) a modem signal receiver coupled to the modem signal transmitter;

wherein, in response to the modem signal receiver receiving the first portion of the first alerting signal sequence, the modem signal transmitter sending a message to the remote modem instructing the remote modem to set the carrier drop register to a time duration at least as long as the duration of the first and second portions of the second alerting signal sequence.

11. The apparatus of claim 10 Wherein the modem signal receiver includes means for receiving a confirmation signal from the remote modem subsequent to the remote modem receiving the message from the modem signal transmitter.

12. Apparatus for providing interoperability between a first modem and a caller identity delivery on call waiting (CIDCW) service that operates when a communications link is established between the first modem and a remote modem, the remote modem having a carrier drop register for storing a value indicative of the time duration for which the remote modem will hold a communications link in the absence of receiving a modem carrier over the communications link;

the CIDCW service, upon receiving an incoming call from a third party and directed to the first modem, sending the first modem a first alerting signal sequence including a first portion indicative of the existence of an incoming telephone call from the third party;

and, if the first modem responds to the first portion with an acknowledgment signal, the first alerting signal sequence further including a second portion specifying the identity of the third party caller;

the CIDCW service sending the first modem a second alerting signal sequence including a first portion indicative of the existence of the incoming telephone call from the third party;

and, if the first modem responds to the first portion of the second alerting signal sequence with an acknowledgment signal, the second alerting signal sequence further including a second portion specifying the identity of the third party caller;

THE APPARATUS CHARACTERIZED BY THE FIRST MODEM INCLUDING:

(a) a modem signal transmitter, and (b) a modem signal receiver coupled to the modem signal transmitter;

wherein, in response to the modem signal receiver receiving the first portion of the first alerting signal sequence, the modem signal transmitter not sending an acknowledgment signal to the CIDCW service;

wherein, in response to the modem signal receiver receiving the first portion of the second alerting signal sequence, the modem signal transmitter sending an acknowledgment signal to the CIDCW service.

wherein, in response to the modem signal receiver receiving the first portion of the first alerting signal sequence, the modem signal transmitter sending a message to the remote modem instructing the remote modem to set the carrier drop register to a time duration at least as long as the duration of the first and second portions of the second alerting signal sequence.

* * * * *